Figure 1:
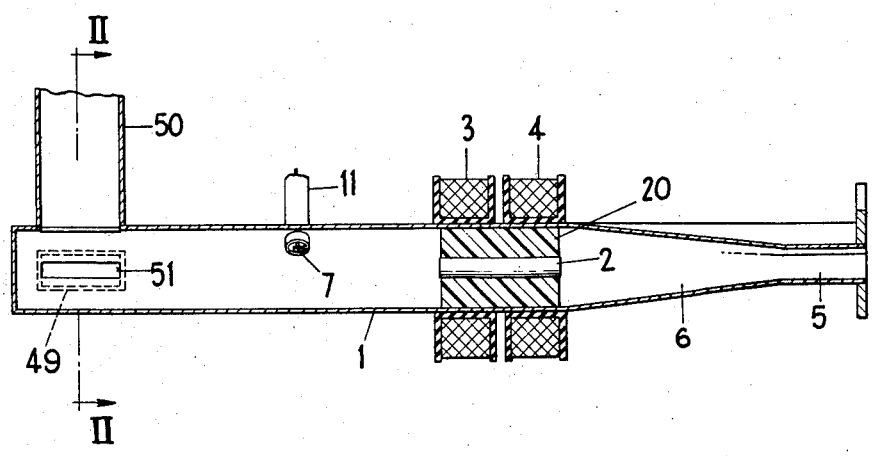

March 12, 1963  R. LEVY  3,081,438
APPARATUS FOR EFFECTING ROTATION OF THE PLANE OF POLARISATION
OF PLANE-POLARISED ELECTROMAGNETIC WAVES
Filed Aug. 26, 1960  2 Sheets-Sheet 1

INVENTOR
RALPH LEVY
BY
ATTORNEYS

United States Patent Office 3,081,438
Patented Mar. 12, 1963

3,081,438
APPARATUS FOR EFFECTING ROTATION OF THE PLANE OF POLARISATION OF PLANE-POLARISED ELECTROMAGNETIC WAVES
Ralph Levy, Carshalton Beeches, England, assignor to The General Electric Company Limited, London, England
Filed Aug. 26, 1960, Ser. No. 52,296
Claims priority, application Great Britain Aug. 28, 1959
4 Claims. (Cl. 333—7)

This invention relates to apparatus for effecting rotation of the plane of polarisation of plane-polarised electromagnetic waves.

The invention is also concerned with apparatus for switching electromagnetic waves selectively to either one of two waveguides.

It is well known that the plane of polarisation of a plane-polarised electromagnetic wave may be rotated if it is passed through a waveguide which is of circular cross-section and which contains suitable ferrite material which may, for example, be in the form of a rod. The amount of rotation depends upon the magnetic field in which the ferrite material lies and one object of the present invention is to make provision in such an arrangement for controlling the amount of rotation of the plane of polarisation so that the resulting waves have a predetermined plane of polarisation.

Another object of the invention is to provide apparatus which enables plane-polarised electromagnetic waves supplied by the apparatus to be polarised selectively in either one of two planes.

Yet another object of the invention is to provide apparatus which enables electromagnetic waves to be passed selectively to either one of two waveguides.

According to the present invention, apparatus for effecting rotation of the plane of polarisation of plane-polarised electromagnetic waves comprises a device of the kind comprising a length of waveguide which contains ferromagnetic ceramic material, for example ferrite material, and which is arranged to effect rotation of the plane of polarisation of plane-polarised electromagnetic waves transmitted through the length of waveguide in dependence upon the magnetic field in which the ferromagnetic ceramic material lies, two polarisation-sensitive couplings which are spaced round the said waveguide and each of which is adapted to supply an electric signal having an amplitude dependent upon the plane of polarisation of waves transmitted by said waveguide after rotation by said device, and means to compare the amplitudes of the signals supplied by the two couplings and to control the magnetic field in which the ferromagnetic ceramic material lies in dependence upon the result of that comparison so that the waves passed by said device have substantially a predetermined plane of polarisation.

Preferably the said means comprises two rectifier elements which supply unidirectional signals the amplitudes of which are dependent upon the amplitudes of the signals picked up by the two couplings respectively and a differencing means which is arranged to apply a magnetic field to the ferromagnetic ceramic material in dependence upon the difference between the amplitudes of the two unidirectional signals. There may be means effectively to reverse the connections between the rectifiers and the differencing means so that waves passed by the device may selectively have either one of two planes of polarisation in dependence upon the connections between the rectifiers and the differencing circuit. Thus the output waves may selectively be polarised in either of two planes. If the arrangement is such that these two planes are at right angles, two further lengths of waveguide may be connected to the previously mentioned length of waveguide so that each is coupled to the previously mentioned waveguide in respect of one of the two planes of polarisation and not the other, the apparatus then constituting a switch since electromagnetic waves supplied to the apparatus can be passed selectively to either one of the two further lengths of waveguide.

Figure 2:
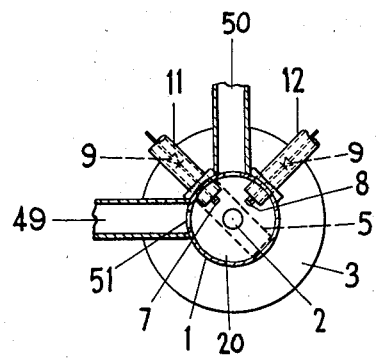
Figure 3:
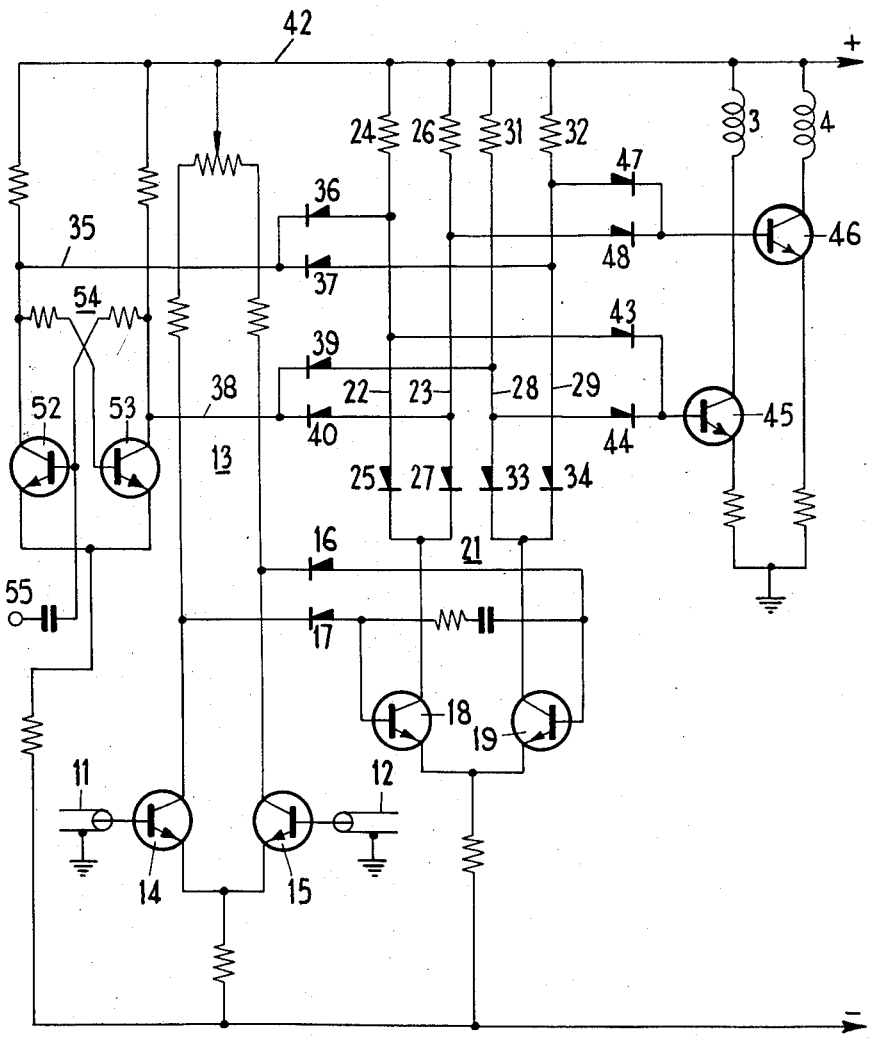

An electromagnetic wave switching system including apparatus in accordance with the invention will now be described by way of example with reference to:

FIGURE 1 which shows a longitudinal cross section through a waveguide device forming part of the switching system, FIGURE 2 shows a sectional elevation of the waveguide device at the line II—II in FIGURE 1, and FIGURE 3 shows an electric circuit associated with the waveguide device.

Referring now to FIGURES 1 to 2, the waveguide device comprises a length of waveguide 1 of circular cross section which contains a ferrite rod 2 and two like coils 3 and 4 which embrace the waveguide 1 and which are arranged so that current carried by these coils sets up a longitudinal magnetic field in the region of the rod 2. A suitable material for the rod 2 is manganese magnesium ferrite, the rod 2 being supported by a member 20 of suitable dielectric material, for example foamed polystyrene.

An input wave guide 5 of rectangular cross section is connected to the waveguide 1 by way of a transition section 6.

Two coupling loops 7 and 8 project into the waveguide 1 on the side thereto remote from the ferrite rod 2. The loops 7 and 8 are spaced 90 degrees apart round the waveguide 1 and the arrangement is such that if neither of the coils 3 and 4 were to be energised, there would be no rotation of the plane of polarisation of electromagnetic waves supplied to the waveguide 1 while waves passing along the waveguide 1 in the region of the coupling loops 7 and 8 would be so polarised that the signal would be picked up by the loop 7 but no signal would be picked up by the other loop 8.

Each of the loops 7 and 8 has an associated rectifier 9, and the unidirectional signals supplied by these two rectifiers, which signals are both of the same sense, are compared and are utilised to control the current carried by the two coils 3 and 4. The signals supplied by these two rectifiers are passed over coaxial lines 11 and 12 respectively and, referring now also to FIGURE 3, the signals fed over these lines are passed to a differential amplifier 13 which includes two n-p-n transistors 14 and 15.

The voltage developed at the collector electrodes of the transistors 14 and 15 are passed by way of two crystal diodes 16 and 17 to the base electrodes of two further n-p-n transistors 18 and 19 which are also connected to form a differential amplifier 21. The collector electrode circuit of the transistor 18 consists of two parallel-connected paths 22 and 23, the path 22 consisting of a resistor 24 connected in series with a crystal diode 25 while the path 23 consists of a resistor 26 connected in series with a crystal diode 27. In similar manner the collector electrode circuit of the transistor 19 is formed by two parallel-connected paths 28 and 29 which contain two resistors 31 and 32 and two crystal diodes 33 and 34.

The arrangement of the amplifier 21 is such that only one of the two parallel-connected paths in the collector electrode circuit of each of the transistors 18 and 19 is operative at any time. For this purpose the paths 22 and 29 are connected to a lead 35 by way of two crystal diodes 36 and 37 respectively and a lead 38 is connected to the two paths 23 and 28 by way of crystal diodes 39 and 40 respectively.

During use of the arrangement, as will be apparent hereinafter, one of the leads 35 and 38 at any time has approximately the voltage of the positive supply line 42 while the other lead has a somewhat lower voltage. Accordingly, under one of these two conditions of voltage on the leads 35 and 38, the crystal diodes 25 and 34 are conducting while the diodes 27 and 33 are cut off so that only the paths 22 and 29 are operative. In the other condition, when the voltages on the leads 35 and 38 are reversed, only the paths 23 and 28 are operative.

The paths 22 and 28 are connected by way of crystal diodes 43 and 44 to the base electrode of a n-p-n transistor 45, this transistor being connected as an amplifier stage with the coil 3 in its collector electrode circuit. Similarly the coil 4 is connected in the collector electrode circuit of a n-p-n transistor 46 which has its base electrode connected to the paths 23 and 29 of the differential amplifier 21 by way of crystal diodes 47 and 48.

If, now the coils 3 and 4 were to carry the same values of current, there would be no resulting magnetic field applied to the ferrite rod 2 with the result that there would be no rotation of the plane of polarisation of waves in the waveguide 1. The plane of polarisation of the input wave is, however, chosen (as previously stated) so that under this condition a signal is picked up by one of the coupling loops 7 and 8 but not by the other. After being rectified by the appropriate rectifier 9, the signal picked up by this loop 7 or 8 causes the collector current of one of the transistors 14 and 15 to be changed from its previous value with the result that different voltages are then developed at the collector electrodes of these transistors. Assuming now that the leads 35 and 38 are biassed so that the paths 22 and 29 of the amplifier 21 are operative, then the unequal voltages developed at the collector electrodes of the transistors 18 and 19 are supplied to the base electrodes of the transistors 45 and 46 respectively and are thereby utilised to increase the current carried by one of the coils 3 and 4 and decrease the current carried by the other. Due to the high gain round the control loop, the effect of this is that the currents carried by the coils 3 and 4 are so controlled that there is a rotation of the plane of polarisation of waves passing along the waveguide 1 of approximately 45 degrees from that previously stated with the result that signals of substantially the same amplitude are picked up by both the coupling loops 7 and 8.

If now the voltages on the leads 35 and 38 are reversed, the paths 23 and 28 of the amplifier 21 are operative with the result that the voltages developed at the collector electrodes of the transistors 18 and 19 are then passed to the base electrodes of the transistors 46 and 45 respectively. This results in the currents carried by the coils 3 and 4 being controlled so that the rotation of the plane of polarisation in the waveguide 1 by the ferrite rod 2 is approximately 45 degrees in the opposite direction to that previously stated.

As shown in FIGURES 1 and 2, two further lengths of waveguide 49 and 50, which are both of rectangular cross section, are connected to the waveguide 1 so as to select from waves passed along the waveguide 1 those having the two planes of polarisation discussed above. In order to match the waveguides 49 and 50 to the waveguide 1, irises, such as the iris 51, are provided.

It will be appreciated that with one of said two conditions of voltage on the leads 35 and 38, input waves supplied over the waveguide 5 are passed to the waveguide 49 while with the other condition of voltages on the leads 35 and 38 waves supplied by the waveguide 5 are passed to the waveguide 50. The leads 35 and 38 are in fact connected to the collector electrodes of two transistors 52 and 53 which are connected in a switching circuit 54. The switching circuit 54 is arranged so that at any time one of the transistors 52 and 53 is conducting while the other is cut off, the particular one of the transistors 52 and 53 that is conducting at any time being dependent upon the voltage supplied to an input terminal 55. In one example, a signal consisting of a train of regularly recurrent impulses is supplied to this terminal 55, the interval between adjacent impulses being of equal duration to the impulses themselves, with the result that waves supplied over the input waveguide 5 are passed in alternate equal periods to the waveguides 49 and 50.

The system described above may be modified by replacing the rod 2 by an annular member which lies along the length of the waveguide 1 in contact with the waveguide wall. This construction is preferable if the system is required to handle high powers since the energy dissipated as heat in the ferrite material is more readily conducted away via the waveguide wall. Furthermore, instead of the rod 2 (or the corresponding annular member) being a single body it may be a composite structure formed, for example, by glueing end to end a plurality of short rods of suitable ferrite material.

It will be appreciated that the invention is not restricted to the use of coupling loops since in the arrangement described above by way of example, the coupling loops 7 and 8 can be replaced by coupling probes. Alternatively each of the coupling loops may be replaced by the short length of waveguide of rectangular cross section which lies across the waveguide 1 and which is coupled thereto by way of a coupling slot. One end of each of these short lengths of waveguide is terminated by a crystal rectifier for the purpose of providing a unidirectional signal, as before, while the other end is terminated by a resistive load.

Both the output waveguides 49 and 50 may be terminated by a utilisation device but if, alternatively, the waveguide 49 is terminated by a matched resistive load, the switching system operates selectively to connect the input waveguide 5 and the output waveguide 50.

I claim:
1. An electromagnetic wave switching system comprising a length of waveguide which contains ferromagnetic ceramic material and which is arranged to effect rotation of the plane of polarization of plane-polarized electromagnetic waves transmitted therethrough in dependence upon the magnetic field in which the ferromagnetic ceramic material lies, an input waveguide connected to one end of said length of waveguide, first and second output waveguides connected to the other end of said length of waveguide to pass to the first output waveguide electromagnetic waves supplied by said length of waveguide with a first predetermined plane of polarization and to pass to the second output waveguide electromagnetic waves supplied by said length of waveguide with a second predetermined plane of polarization which is different from the first plane of polarization, two polarization-sensitive couplings which are spaced around said length of waveguide and each of which supplies an electric signal having an amplitude dependent upon the plane of polarization of waves transmitted by said length of waveguide after rotation therein, means to provide a magnetic field in which said ceramic ferromagnetic material lies, comparison means to compare the electric signals supplied by the two polarization-sensitive couplings and to control the last mentioned means to vary the magnetic field as a result of said comparison, and switching means selectively having first and second conditions to control the comparison means so that in said first and second conditions the magnetic field in which the ceramic ferromagnetic material lies in such that electromagnetic waves supplied over the input waveguide are passed mainly to the first and second output waveguides respectively.

2. A switching system according to claim 1 wherein said two planes are at right angles.

3. A switching system according to claim 1 wherein each of said polarisation-sensitive couplings is a coupling loop projecting into the length of waveguide.

4. An electromagnetic wave switching system according to claim 1 wherein the comparison means comprises two rectifier elements which supply unidirectional signals the amplitudes of which are dependent upon the amplitudes of the signals picked up by the two couplings respectively and a differencing means which is arranged to apply a magnetic field to the ferromagnetic ceramic material in dependence upon the difference between the amplitudes of the two unidirectional signals, and wherein the switching means is operative effectively to reverse the connections between the rectifiers and the differencing means.

References Cited in the file of this patent

UNITED STATES PATENTS

| | | |
|---|---|---|
| 2,824,288 | Sensiper | Feb. 18, 1958 |
| 2,857,575 | Zaleski | Oct. 21, 1958 |

OTHER REFERENCES

Caswell: "Electronics," October 1953, pages 246, 248, 250, 252 and 254.